(12) United States Patent
G. Nader et al.

(10) Patent No.: US 7,970,361 B2
(45) Date of Patent: Jun. 28, 2011

(54) FREQUENCY BAND RECOGNITION METHODS AND APPARATUS

(75) Inventors: Ali G. Nader, Malmö (SE); Béla Rathonyi, Lomma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 808 days.

(21) Appl. No.: 11/946,142

(22) Filed: Nov. 28, 2007

(65) Prior Publication Data

US 2009/0137267 A1 May 28, 2009

(51) Int. Cl.
*H03C 1/62* (2006.01)
(52) U.S. Cl. ............... 455/115.1; 455/552.1; 455/67.11; 455/160.1; 455/226.2; 455/403; 455/62; 455/69; 455/437; 455/182.1; 455/303; 375/224; 375/316; 370/338; 370/329; 370/346; 370/337; 381/94.3; 381/320; 381/317
(58) Field of Classification Search ............... 455/552.1, 455/67.1, 67.11, 160.1, 226.2, 403, 450, 455/465, 62, 69, 437, 182.1, 303; 375/224, 375/316; 370/338, 329, 346, 337; 381/94.3, 381/320, 317
See application file for complete search history.

(56) References Cited

U.S. PATENT DOCUMENTS

| | | | | |
|---|---|---|---|---|
| 4,628,529 A | * | 12/1986 | Borth et al. ................... | 381/94.3 |
| 5,157,709 A | * | 10/1992 | Ohteru .......................... | 455/465 |
| 5,218,630 A | * | 6/1993 | Patsiokas et al. ............. | 455/450 |
| 5,491,837 A | * | 2/1996 | Haartsen ........................ | 455/62 |
| 5,719,902 A | * | 2/1998 | Quick et al. ................... | 375/224 |
| 5,734,980 A | | 3/1998 | Hooper et al. | |
| 6,205,334 B1 | | 3/2001 | Dent | |
| 7,643,811 B2 | * | 1/2010 | Reunamaki et al. ........ | 455/226.2 |
| 2003/0236079 A1 | * | 12/2003 | Hasegawa ................... | 455/160.1 |
| 2004/0132410 A1 | * | 7/2004 | Hundal et al. ............. | 455/67.13 |
| 2006/0072524 A1 | * | 4/2006 | Perahia et al. ................ | 370/338 |
| 2007/0121552 A1 | | 5/2007 | Lindoff | |
| 2008/0153486 A1 | | 6/2008 | Ramkull et al. | |
| 2008/0166976 A1 | * | 7/2008 | Rao ................................ | 455/69 |
| 2009/0042532 A1 | * | 2/2009 | Bienas et al. ................. | 455/403 |

FOREIGN PATENT DOCUMENTS

| | | |
|---|---|---|
| EP | 1 367 844 A1 | 12/2003 |
| EP | 1367844 A1 | 12/2003 |
| WO | 03/053086 A1 | 6/2003 |

OTHER PUBLICATIONS

3GPP Technical Specification TS 23.122 Non-Access-Stratum (NAS) functions related to Mobile Station (MS) in idle mode, Section 4.4, Release 7, V7.5.0, Jun. 2006.

(Continued)

*Primary Examiner* — Lewis G West
*Assistant Examiner* — April G Gonzales
(74) *Attorney, Agent, or Firm* — Potomac Patent Group PLLC (57) ABSTRACT

A user equipment (UE) without service in a communication system measures the radio-frequency (RF) power in a bandwidth received by the UE on the possible downlink carriers in a frequency band that is supported by the UE. The bandwidth is typically the bandwidth of communication channels in the communication system. If the UE supports more than one frequency band, the UE may scan more than one of those frequency bands. The UE processes the measurement results with a noise-reducing enhancement technique, such as a median filter, and then examines the processed results for a particular spectral shape, e.g., a shape that corresponds to a cell signal.

22 Claims, 7 Drawing Sheets

OTHER PUBLICATIONS

3GPP Technical Specification TS 25.101 User Equipment (UE) Radio Transmission and Reception (FDD), Section 5, Release 7, V7.7.0, Mar. 2007.
EPO, International Search Report in PCT/EP2008/065038, Feb. 2, 2009.
EPO, Written Opinion in PCT/EP2008/065038, Feb. 2, 2009.
3GPP TS 25.101 V7.7.0, User Equipment (UE) Radio Transmission and Reception (FDD) (Release 7), Mar. 2007, Section 5.
3GPP TS 23.122 V7.5.0, Non-Access-Stratum (NAS) functions related to Mobile Station (MS) in idle mode (Release 7), Jun. 2006, Section 4.4.

* cited by examiner

FREQUENCY BAND RECOGNITION METHODS AND APPARATUS

BACKGROUND

This invention relates to electronic communication systems and more particularly to wireless communication systems.

Since the introduction of wireless telecommunication systems, the number of mobile users has grown, and is expected to continue growing substantially, especially with mass-market uptake of mobile triple play (a combination of mobile telephony, mobile broadband, and mobile television (TV)). That increase and increasing user demand for higher data rates have created a need for additional frequency bands and user equipment, such as mobile phones and other remote terminals, that supports multiple frequency bands.

Mobile communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as the universal mobile telecommunications system (UMTS), which is a third generation (3G) mobile system being developed by the European Telecommunications Standards Institute within the International Telecommunication Union's IMT-2000 framework. The Third Generation Partnership Project (3GPP) promulgates specifications for the UMTS and WCDMA systems.

3G mobile communication systems based on WCDMA as the radio access technology (RAT) are being deployed all over the world. High-speed downlink packet access (HSDPA) is an evolution of WCDMA that provides higher bit rates by using higher order modulation, multiple spreading codes, and downlink-channel feedback information. Another evolution of WCDMA is Enhanced Uplink (EUL), or High-Speed Uplink Packet Access (HSUPA), that enables high-rate packet data to be sent in the reverse, or uplink, direction. New RATs are being considered for evolved-3G and fourth generation (4G) communication systems, although the structure of and functions carried out in such systems will generally be similar to those of earlier systems.

Figure 1:
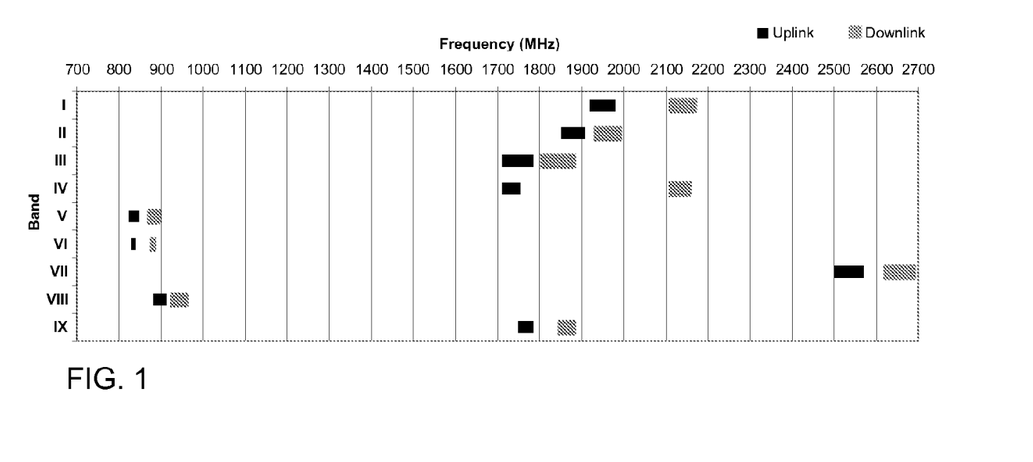
FIG. 1 depicts frequency bands for communication systems.

WCDMA communication systems currently operate in frequency bands around 850 megahertz (MHz), 1700 MHz (in Japan and the U.S.), 1800 MHz, and 2100 MHz (in the U.S). To enhance capacity and coverage potential in the future, WCDMA systems are expanding to frequency bands around 900 MHz and 2500 MHz. FIG. 1 is a plot of band identification number (on the vertical axis) against frequency (on the horizontal axis) for several WCDMA frequency bands. Details of this arrangement are described in, for example, Section 5 of 3GPP Technical Specification (TS) 25.101 V7.7.0, User Equipment (UE) Radio Transmission and Reception (FDD) (Release 7) March 2007. It will be seen from FIG. 1 that some of the frequency bands overlap, e.g., Bands V, VI, and VIII from 869-915 MHz; and Bands III, IV, and IX at 1710-1785 MHz.

As a result, a UE supporting several frequency bands has to cope with the problem of searching for cells/services in the correct frequency band, which depends on the geographical area that the UE is in. A cell belongs to a public land mobile network (PLMN), and cell/PLMN selection has a number of objectives, which include connecting a UE to the cell(s)/PLMN(s) that will provide the highest quality of service (QoS), enable the UE to consume the least power, and/or generate the least interference. Cell/PLMN selection is usually based on the signal strength (signal to interference ratio (SIR) or signal to noise ratio (SNR)) of candidate cells. For 3GPP-compliant mobile communication systems, the PLMN selection process is specified in Section 4.4 of 3GPP Technical Specification (TS) 23.122, Non-Access-Stratum (NAS) functions related to Mobile Station (MS) in idle mode (Release 7), V7.5.0 (June 2006).

When a conventional UE is powered on or has lost service, the UE usually assumes that it is in the same geographical area as it was when it was last powered off or lost service. This is done as a way to optimize cell searching procedures. Thus, a search for a cell/service is started in the last known frequency/frequencies where service was available. If such a search proves fruitless, the typical UE starts an "initial cell search" procedure that involves scanning all RF carriers in the frequency band(s) that the UE believes is or are available in order to find a suitable cell of the selected operator, or PLMN. On each of the RF carriers, the UE searches at least for the strongest cell.

For an example of the current typical operation, assume that a UE capable of handling the WCDMA 2100 MHz frequency band (i.e., Band I in FIG. 1) is turned off in a geographical area (e.g., a country such as Sweden) where the 2100 MHz band actually is used for WCDMA. Assume also that the UE was camped on a cell and service was available before the UE was powered off. When the UE is powered on again, the UE assumes that it has not moved geographically and hence it tries to find the last cell or another cell with the last-known carrier in the 2100 MHz band. If the UE has moved or for some other reason cannot find a cell in the 2100 MHz band, the UE proceeds to scan the 2100 MHz band, measuring its received power on each possible carrier in the band.

Figure 2:
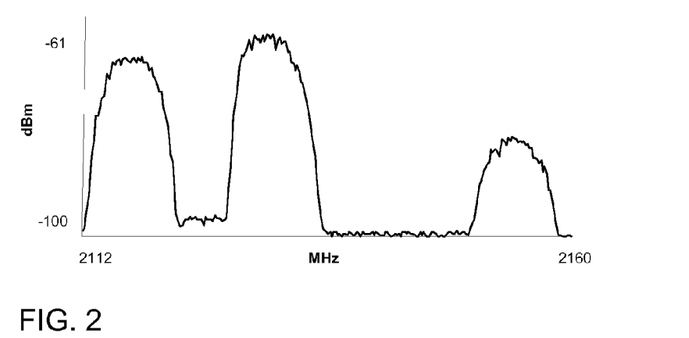
FIG. 2 is an example of a result of a received-energy scan in a 2100 MHz frequency band.

The scan procedure, which may be called a received signal strength indicator (RSSI) scan, results in measurements within the relevant channel bandwidth (e.g., 5 MHz) on roughly 300 possible carriers in the 2100 MHz band. An RSSI scan can usually be fast; e.g., it may take about 300 milliseconds (ms) for the UE to scan 300 carriers in the 2100 MHz band. FIG. 2 shows an example of a result of an RSSI scan as a plot of received energy versus frequency, showing energy peaks measured by a UE in the 2100 MHz band. At this stage, no intelligent processing of the received energy has been performed, i.e., the received energy could be anything from noise to cell transmissions.

The typical UE deeply explores (i.e., performs cell search on) each of the frequencies having more than a threshold energy, normally starting around the highest-energy frequencies and working through the rest of the frequencies until a WCDMA cell is found to camp on. Cell search is a time- and energy-consuming procedure for a UE; for example, each cell search may take up to 400 ms. For more efficient search, some UEs include information on how PLMNs are usually planned and start their cell searches based on that information, although this can be a drawback if a network operator re-plans the way the carriers are distributed.

Cell search is traditionally based on the signal strength or SNR of candidate cells. For example, U.S. patent application Ser. No. 11/289,001 filed on Nov. 29, 2005, by B. Lindoff for "Cell Selection in High-Speed Downlink Packet Access Communication Systems", which is incorporated here by reference, describes a cell selection process that also takes into account the delay spread of the communication channel.

To illustrate some of the problems with existing cell search approaches, assume that a UE supports Bands I, III, and V depicted in FIG. 1, that the UE was camped on a cell in Band I just prior to its being powered off, and that the UE has been moved to a geographical area where Band III is used for WCDMA. With a conventional cell search algorithm, the UE assumes when it is powered on that it is still in the same geographic area. After unsuccessfully searching for a cell on the last-camped-on frequency, the UE performs an RSSI scan in the downlink part of Band I and then conducts a futile search for cells in Band I before it eventually understands that there are no cells available in this band. Much energy and time is wasted on the search for non-existent Band I cells, and even if the UE eventually determines that Band I is not the correct band, the UE does not know which of its other supported bands (Band III and Band V in this example) is correct. Thus, the UE could perform another futile search.

As another example, assume that a UE operating in Band I suddenly finds itself in a radio shadow (e.g., the UE is taken into a basement or is driven into a tunnel), resulting in loss of service. After a long-enough period in the radio shadow, the UE runs an RSSI scan of Band I and determines that no cells are available. The UE may then search the other two bands it supports (Bands III and V in this example), wasting energy and time. If during the time that the UE is searching for cells in the other two bands the radio environment improves (e.g., the UE leaves the basement or tunnel), the UE may not notice as it is busy with the other bands and give the user no service until the UE finds service again in Band I. Of course, such operation is not be well received by the user.

Searching in an incorrect frequency band wastes a substantial amount of electric power, which is a concern for a battery-powered UE, and subjects the user to a substantial amount of time without service. A UE may even falsely believe that energy received from other sources is received from candidate cells (radio base stations (RBSs)), and hence be tricked into searching for cells in vain. This is especially likely in cases where frequency bands overlap each other (see, e.g., Bands I and II around 1900 MHz in FIG. 1). Hence, it is very important for a multi-band UE to use intelligent searching strategies.

European Patent Application EP 1 367 844 A1 and U.S. Patent Application Publication No. U.S. 2003/0236079 describe a cellular phone that includes an RSSI measurement circuit for measuring power levels of received baseband signals at divided band portions of a whole frequency band, a band sorting circuit that sorts the divided band portions based on the descending order of the power levels, and a cell search circuit that searches the carriers of each divided band portion in the order of the sorting results, to thereby determine a tentative waiting cell.

U.S. patent application Ser. No. 11/615,162 by Joachim Ramkull et al. for "Efficient PLMN Search Order" describes how a UE can shorten the time needed to find a cell, such as a suitable or acceptable cell, by using intelligent search orders.

SUMMARY

In accordance with aspects of this invention, there is provided a method in a communication system of recognizing the presence of a transmitter based on signal measurements. The method includes measuring a received energy at a plurality of different frequencies in a frequency band; enhancing the measured received energies such that noise in the measured received energies is reduced; and determining whether the measured received energies include a specific spectral shape, thereby recognizing the presence of the transmitter.

In accordance with further aspects of this invention, there is provided an apparatus in a communication system for recognizing the presence of a transmitter based on signal measurements. The apparatus includes a device configured to measure a received energy at a plurality of different frequencies in a frequency band; an enhancer configured such that noise in the measured received energies is reduced; and a processor configured to determine whether the measured received energies include a specific spectral shape, thereby recognizing the presence of the transmitter.

BRIEF DESCRIPTION OF THE DRAWINGS

The various objects, features, and advantages of this invention will be understood by reading this description in conjunction with the drawings, in which.

DETAILED DESCRIPTION

This application focuses on WCDMA communication systems for economy of explanation, but it will be understood that the principles described in this application can be implemented in other communication systems.

The inventors have recognized that after performing a received-energy scan (e.g., an RSSI scan) of a frequency band, a UE with no service should examine the scan result for a spectral shape typical of a signal transmitted with a certain channel bandwidth (e.g., 5 MHz for a WCDMA system) before the UE further explores that band, i.e., before the UE searches for cells where received-energy peaks appear in the scan result. A frequency band that includes one or more such spectral shapes can be assumed by the UE to be a band in which service can be found, and so the UE can further explore received-energy peaks of the one or more shapes in an improved search for service.

If the received-energy scan result from more than one frequency band contains a suitable spectral shape, the UE can consider the frequency band having the most such spectral shapes as the band in which service is most likely to be found. As an alternative, the UE can consider all frequency bands containing suitable spectral shapes as bands in which service is likely to be found and explore received-energy peaks in such bands in any suitable way. For example, the peaks can be explored in a round-robin way or starting with the frequency band that geographically lies closest to where the UE last experienced service.

For simplicity, it is assumed in the following description that the UE cannot easily decide its geographical location, either because the UE lacks positioning functionality (such as a Global Positioning System (GPS) locating system or the like) or because the UE's positioning functionality relies on network service that is not available or is too costly in terms of time, battery power, etc. Moreover, even if the user knows where he or she is geographically, it is assumed that the user is unable or unwilling to specify that location to the UE.

Figure 3:
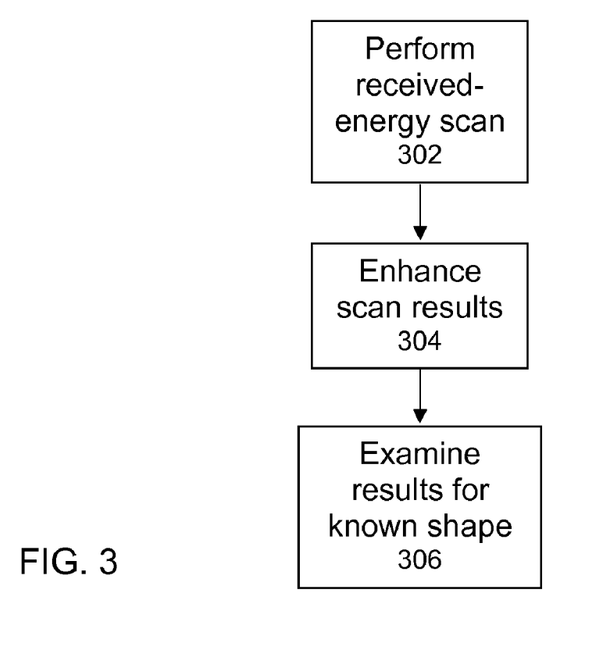
FIG. 3 is a flowchart of a method of recognizing the presence of a transmitter.

At some point in time, e.g., after a fruitless cell search, a UE without service performs at least one received-energy scan, e.g., an RSSI scan, which is to say that the UE measures the radio-frequency (RF) power in a bandwidth received by the UE on the possible downlink carriers in a frequency band that is supported by the UE. This is depicted by step 302 in FIG. 3, which is a flowchart of a method of recognizing the presence of a transmitter. The bandwidth is typically the bandwidth of communication channels in the communication system, e.g., 5 MHz in a WCDMA system. If the UE supports more than one frequency band, the UE may perform an RSSI scan of more than one of those frequency bands. The UE processes the result of an RSSI scan with a noise-reducing enhancement technique (e.g., a median filter) as depicted by step 304, and then examines the processed RSSI scan result for a known spectral shape, e.g., a spectral shape that corresponds to a RBS signal, as depicted by step 306.

The inventors have recognized that, in perhaps its simplest form, a spectral shape that corresponds to a RBS signal is a peak, the height of which depends on the radio environment and the width of which depends on a convolution of the RBS signal and the UE receive filter's transfer function. An approximation of the convolution is a sum of the RBS signal's bandwidth and the UE receive filter's bandwidth. For example, if the UE has a receive filter that has a bandwidth of 5 MHz and the UE receives a RBS signal that has a bandwidth of 5 MHz, the width of the peak is about 10 MHz.

Figure 4:
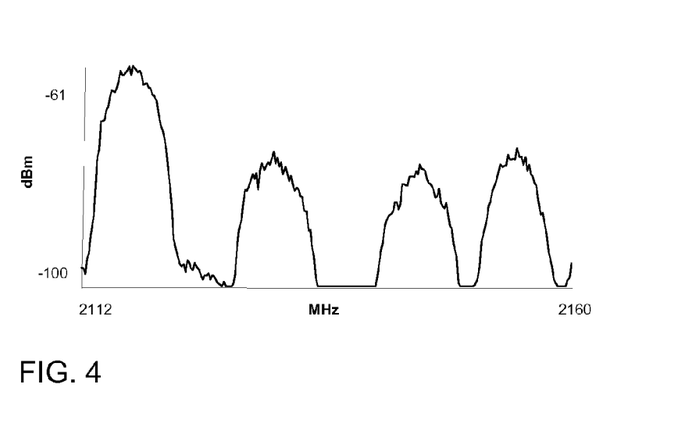
FIG. 4 is another example of a result of a received-energy scan in a 2100 MHz band, showing four spectral shapes that correspond to RBS signals.

FIG. 4 is a plot of measurements of received energy (in dBm) against frequency in the 2100 MHz band, and four such spectral shapes that correspond to RBS signals can be observed in FIG. 4. It will be noted that three such spectral shapes corresponding to RBS signals appear in FIG. 2, which is the result of an RSSI scan in a geographical area that is different from the area of FIG. 4. Although a spectral shape corresponding to a RBS generally has a spectral width that is the result of a convolution as described above, it will be appreciated that spectral bands can be examined for spectral shapes having different spectral widths as described in more detail below.

The characteristics (e.g., spectral width) of a spectral shape that corresponds to a RBS signal may be identified in the UE in various ways in accordance with this invention. For example, the characteristics can determined in advance by simulations or live tests in various environments and then stored in a suitable memory in the UE during manufacture or after being downloaded to the UE from a computer server. The characteristics may also be determined from the experience of the UE and/or shared between several UEs. The UE may determine such characteristics itself based on the UE's experience and may update the characteristics after successful and failed cell-search procedures. Hence, the more a user travels to various geographical areas, the more "experienced" the UE becomes and the more adapted the characteristics become to the user's way of moving around. Of course, the UE would update the characteristics after the UE has made sure that it is in the correct geographical area.

As described above, the frequency band(s) in which such spectral shape matches are found is(are) assumed by the UE to be the frequency band(s) that the UE is in, and thus the UE can perform cell searches in such frequency band(s) without wasting time and energy on cell searches in incorrect frequency bands.

If no spectral shape corresponding to a RBS signal is found by a UE, the UE advantageously initiates a timer (which may be a hardware or software timer of variable duration). Upon timeout of the timer, the UE restarts the search process, e.g., by performing an RSSI scan. Use of the timer may occur in various scenarios, e.g., when the UE is in a radio shadow, such as a tunnel. The duration of the timer may increase after each failed cell search. In this way, the UE can avoid futile searches for cells and waste of battery power.

FIGS. 5 and 6A, 6B, 6C are flow charts of methods that can be carried out by a UE in implementation of this invention.

Figure 5:
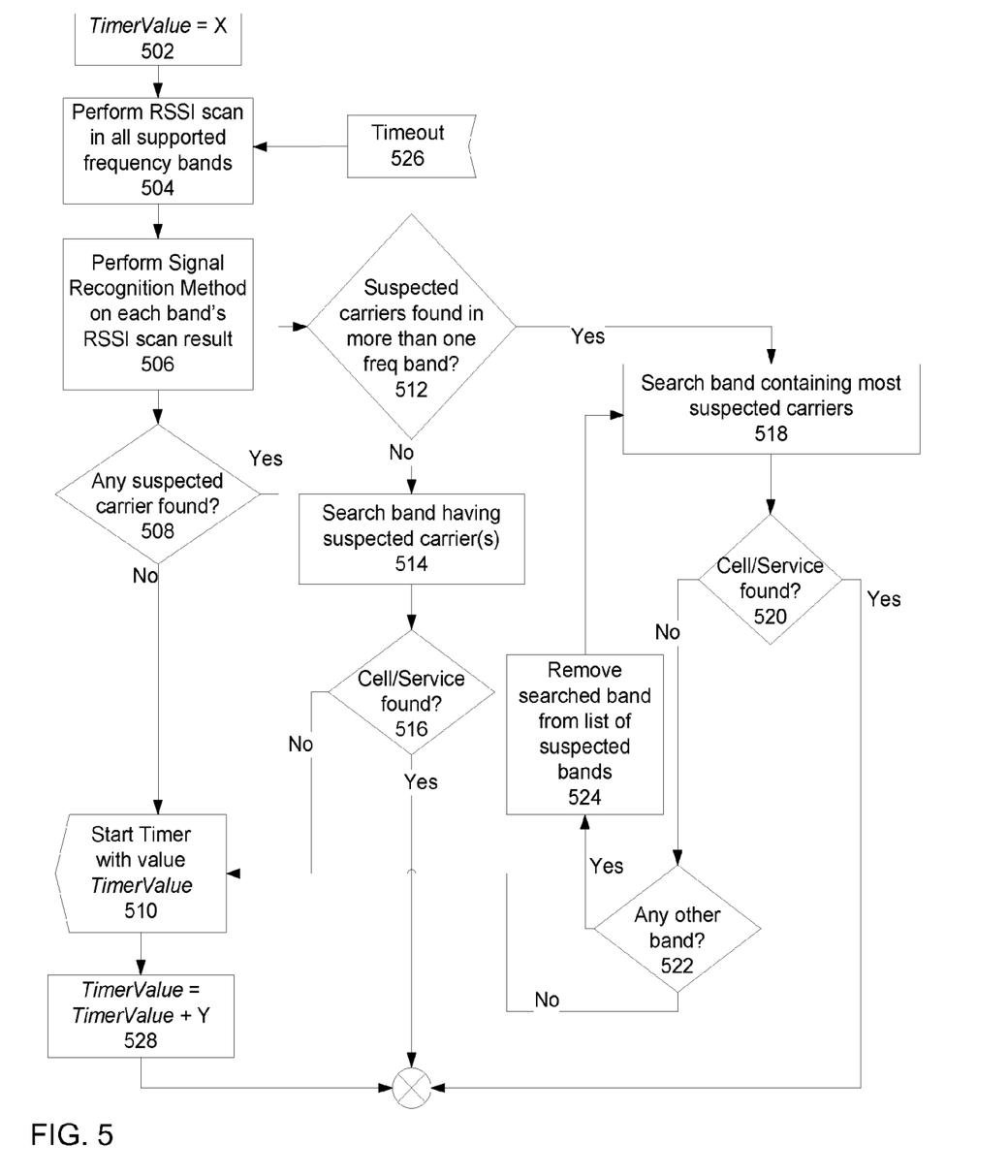
FIG. 5 is a flow chart of a method of frequency band recognition.

FIG. 5 depicts a method of frequency band recognition, in which RSSI scans are performed in a plurality of frequency bands, results of the RSSI scans are processed, and a timer supervises operation of the method, which would typically be initiated when the UE determines that it is "lost", i.e., it needs to do a complete band scan. It will be appreciated that at that point, the UE has already searched the last-known good band. One of the reasons for performing RSSI scans of all of the supported bands rather than doing so one band at a time is that RSSI scans are "cheap", i.e., an RSSI scan does not consume much time or much power. Also, in case several carriers are found in various bands, the most probable band could be recognized faster. For example, if the UE scans one band at a time and finds one suspected carrier, which later turns out to be a "false" carrier, then much time will be wasted on cell searches within that band. In contrast, doing RSSI scans in all bands and finding out that another band contains four carriers lets the UE identify that other band as a more likely candidate, saving cell-search costs in this example.

As shown in FIG. 5, the method can begin by initializing a timer (step 502), which may be either a software or a hardware timer, to a time period X that is greater than or equal to zero seconds. The UE then performs an RSSI scan or other received-energy scan in all supported frequency bands (step 504), and after collecting scan results, the UE carries out (step 506) a signal recognition method that is described in more detail below in connection with FIGS. 6A, 6B, 6C. The signal recognition method is preferably carried out on the scan result from each supported frequency band. It will become apparent that as a result of the X timer, the algorithm is run again, but not immediately, if no cells are found at all, and between runs, the algorithm is run progressively less often as a factor Y is added in (see step 528). Thus, power is not wasted on constant searching when the UE has no coverage for a long time.

If the signal recognition method does not find a possible carrier (No in step 508), the X timer is started (step 510). If the signal recognition method does find a possible carrier (Yes in step 508), the UE determines whether one or more suspected carriers has been found in more than one frequency band (step 512). If one or more suspected carriers has not been found in more than one frequency band (No in step 512), a cell search is conducted in the band having the suspected carrier(s) (step 514). The cell search is started around the suspected carrier(s), and if several suspected carriers have been found, the search can be started with the carrier having the highest measured signal strength level. If a cell or more generally service is not found by the cell search (No in step 516), the X timer is started (step 510). If service is found (Yes in step 516), the program flow continues to other operations of the UE.

If one or more suspected carriers has been found in more than one frequency band (Yes in step 512), the UE conducts a cell search in the band having the most suspected carriers (step 518). If several bands contain the same amount of suspected carriers, then one of the bands can be picked first in any suitable way. For example, the band that is closest geographically can be picked first. In any event, the cell search is preferably started around the found suspected carrier(s), and if several suspected carriers have been found, the cell search may start with the carrier having the highest measured signal strength level. If a cell or more generally service is not found by the cell search (No in step 520), the UE determines whether any of the several bands containing suspected carriers remain to be searched (step 522). If one or more bands remains (Yes in step 522), the band that was just searched is removed from the list of several bands (step 524) and program flow returns to step 518. With the just-searched band removed, another of the band(s) having suspected carrier(s) is picked as described above. If no more bands remain (No in step 522), the X timer is started (step 510). If service is found (Yes in step 520), the program flow continues to other operations of the UE.

In the course of the method, if the timer times out (step 526), the UE repeats the method starting with the received-energy scanning step 504. The UE can escape the method after lapse of a suitable period Y plus the timer period (step 528).

Figure 6A:
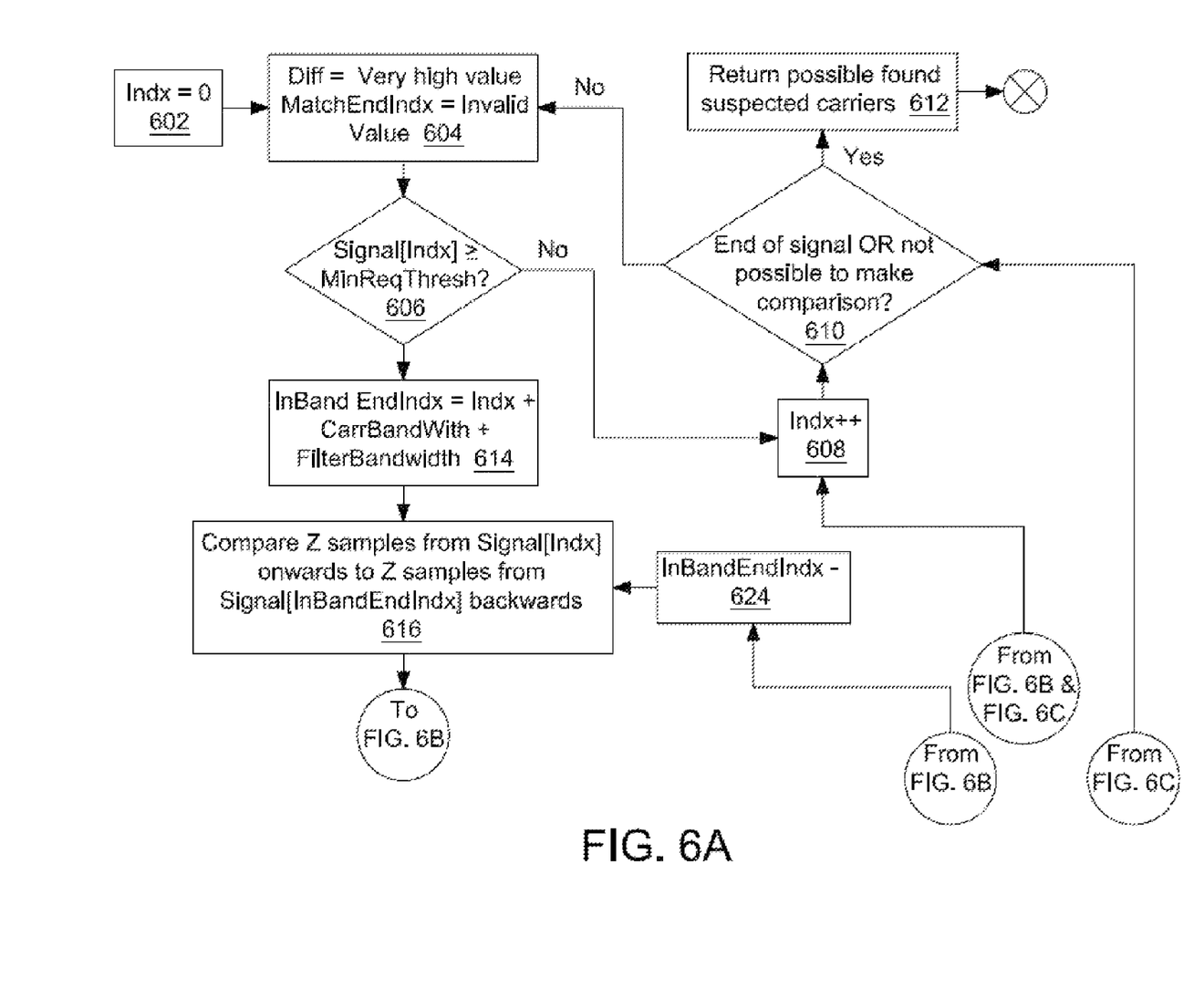
FIGS. 6A, 6B, 6C are a flow chart of a method of signal recognition.
Figure 6B:
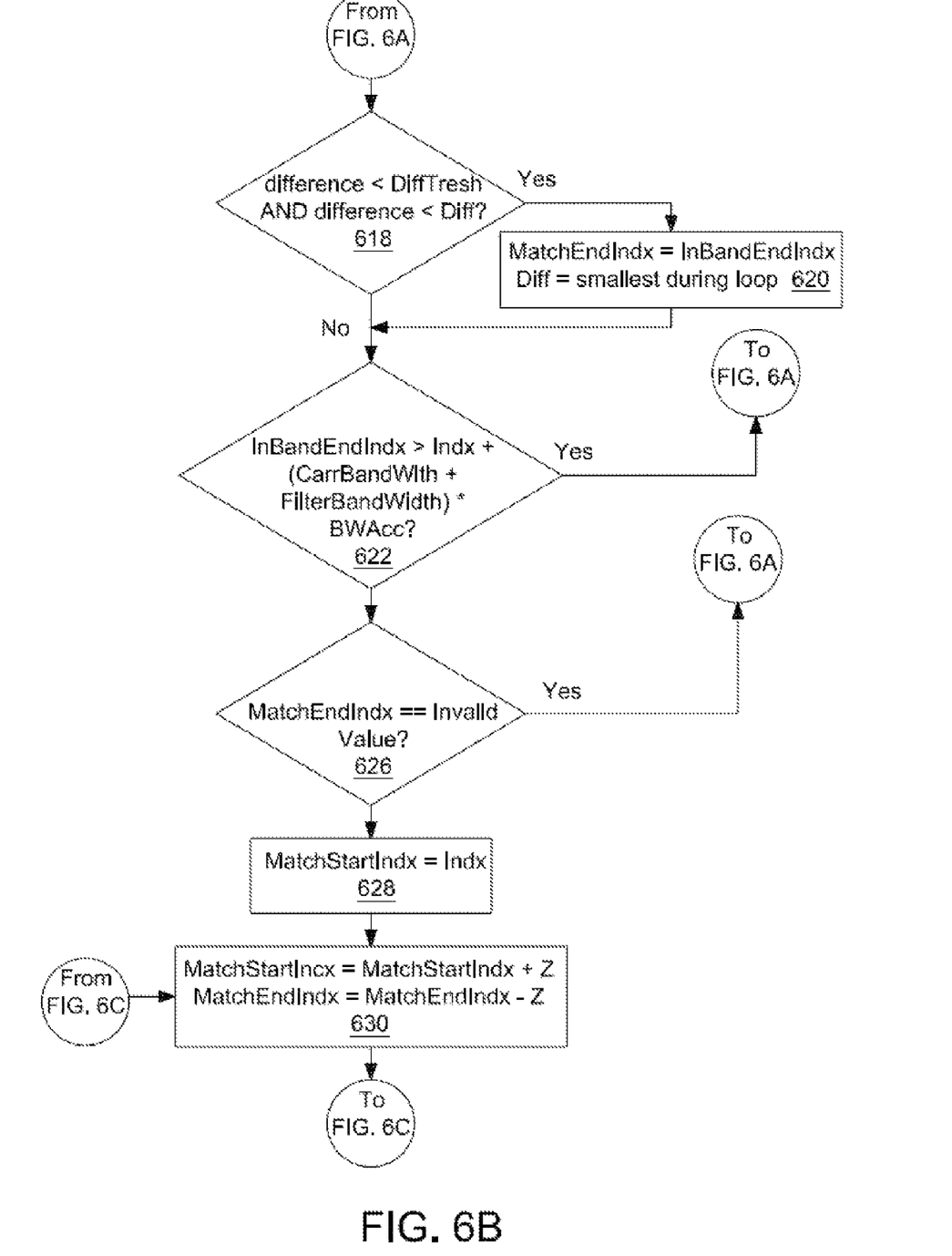
Figure 6C:
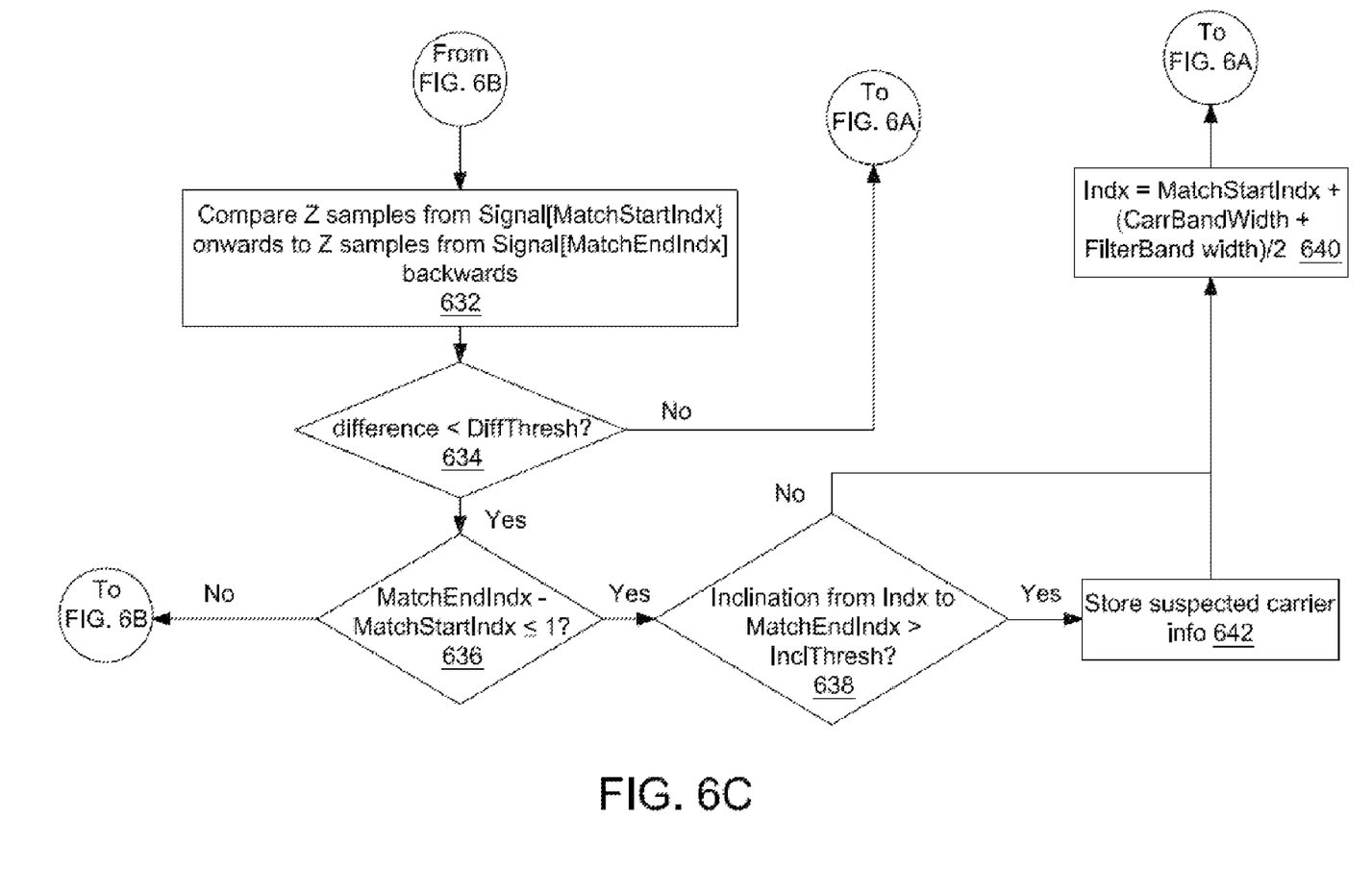

FIGS. 6A, 6B, 6C depict a method of signal recognition that advantageously has the result of a received-energy scan, such as an RSSI scan, as input from a method of frequency band recognition such as that depicted by FIG. 5. Considered from one point of view, the method starts from an assumption that the spectral shape to be identified is a convolution of an RBS signal and a receive filter function, but then varies the shape through the effect of parameters, such as BWAcc. If not previously enhanced to reduce noise, the input data is preferably processed by an enhancement technique such as median filtering that smoothes the input data, removing spikes. It will be understood that a median filter removes spikes and is easy to implement in a UE, and hence a median filter is a useful example of an enhancement technique, but other filters could also be used. It is currently believed that some kind of enhancement is needed in examining the RSSI scan results as depicted in FIGS. 6A, 6B, 6C.

As shown in FIG. 6A, a counter Indx is initialized to zero (block 602). A difference parameter Diff is initialized to a very high value, and a counter MatchEndIndx is initialized to an invalid value (block 604). In step 606, it is determined whether the received energy value at the Indx value is greater than or equal to a minimum required threshold value MinReqThresh, which is the minimum required signal level required in the communication system. For example, MinReqThresh=−116 dBm in a WCDMA communication system. If the received energy is not at least the threshold value (No in step 606), the counter Indx is increased by one (block 608) and it is determined (step 610) whether the end of the scan results has been reached or more generally whether it will not be possible to make any further comparisons. If the end of the scan results has been reached (Yes in step 610), information identifying suspected carrier(s) is returned (block 612) and program flow continues based on the suspected carrier(s), e.g., with step 508 depicted in FIG. 5. If the end of the scan results has not been reached or if more comparisons are possible (No in step 610), program flow returns to block 604, and the received energy value at the next Indx value is compared to the MinReqThresh value (step 606).

If a received energy value is greater than or equal to the minimum required threshold value MinReqThresh (Yes in step 606), an InBandEndIndx variable is set to the sum of the Indx value, a CarrBandWidth value, and a FilterBandwidth value (step 614). The CarrBandWidth value is the number of indices in the signal array that corresponds to the carrier bandwidth, e.g., 5 MHz in a WCDMA system, and the FilterBandwidth value is the number of indices in the signal array that corresponds to the receive filter bandwidth.

In step 616, an array of Z samples from Signal[Indx] and onwards is compared to a corresponding array of Z samples from Signal[InBandEndIndx] and backwards. It will be understood that in this Z-length array comparison process, one of the arrays needs to be horizontally mirrored. The number of received energy values Z is greater than zero, and Z=1 means Signal[Indx]. The Z samples in an array need not be consecutive, and at every step, the variable Z is chosen such that samples do not overlap when mirrored in the comparison.

In step 618 (see FIG. 6B), the differences between values in the arrays are compared to a DiffThresh value and a Diff value, where the DiffThresh value is the maximum accepted difference between the compared received energy samples. If the differences are less than both (Yes in step 618), the MatchEndIndex value is set to the InBandEndIndx value and the Diff value is set to the smallest difference during the loop (block 620). Otherwise (No in step 618), it is determined (step 622) whether the InBandEndIndx value is greater than the sum of the Indx value and a factor BWAcc times the sum of the CarrBandWidth value and the FilterBandwidth value. The factor BWAcc advantageously provides some flexibility in determining the presence of suspected carriers, and may for example be determined by the carrier bandwidth accuracy, expressed as a percentage.

If the InBandEndIndx value is greater than the sum (Yes in step 622), the InBandEndIndx value is reduced (step 624) and the program flow continues from step 616 (see FIG. 6A). If the InBandEndIndx value is not greater than the sum (No in step 622), it is determined (step 626) whether the MatchEndIndex value is an invalid value. If so (Yes in step 626), the program flow returns to step 608 (see FIG. 6A). If not (No in step 626), the MatchStartIndx value is set to the Indx value (block 628).

In block 630, the MatchStartIndx value is increased by Z and the MatchEndIndx value is decreased by Z. In block 632 (see FIG. 6C), the Z samples from Signal[MatchStartIndx] onwards are compared to corresponding Z samples from Signal[MatchEndIndx] backwards. Again it will be noted that in this Z-length array comparison process, one of the arrays needs to be horizontally mirrored. Also as noted above, Z>0, Z=1 means Signal[Indx], the Z samples need not be consecutive, and at every step variable Z is chosen such that samples do not overlap when mirrored in the comparison.

In step 634, it is determined whether the difference is less than the DiffThresh value. If not (No in step 634), the program flow returns to step 608 (see FIG. 6A). If so (Yes in step 634), it is determined (step 636) whether MatchEndIndx−MatchStartIndx≦1. If not (No in step 636), the program flow returns to block 630 (see FIG. 6B) and the MatchStartIndx value is increased by Z and the MatchEndIndx value is decreased by Z. If so (Yes in step 636), it is determined (step 638) whether the inclination, or slope, of the received energy values from the Indx value to MatchEndIndx value is greater than an inclination threshold InclThresh, which is the minimum required inclination from the suspected carrier edge up to the suspected carrier peak.

If the inclination is not greater than the inclination threshold (No in step 638), the Indx value is set to the sum of the MatchStartIndx value and one-half of the sum of the CarrBandWidth value and the FilterBandwidth value (step 640). If the inclination is greater than the inclination threshold (Yes in step 638), a suspected carrier has been found, and information about the suspected carrier, such as its frequency or frequency range is stored (step 642) for eventual return by step 612 (see FIG. 6A).

From FIGS. 5 and 6A, 6B, 6C, it can be seen that suspected carrier signals are recognized in the RSSI scan results by considering the collection of received-energy measurements as laid out as depicted in FIGS. 2 and 4, and traversing the collection from beginning to end, with each measurement being compared with a corresponding measurement up to twice the bandwidth away. If a pair of measurements have the same or almost the same value, the algorithm continues by examining measurement pairs traversing inwards until they meet. It will be appreciated of course that variations of the particular method flows depicted in FIGS. 5 and 6A, 6B, 6C can be used.

For example, suppose the method in FIGS. 6A, 6B, 6C starts with a measurement taken at 2100 MHz. Such a measurement is compared with a measurement taken at 2110 MHz. If the measurement values are the same or substantially the same, the method next compares measurements at, say, 2101 MHz and 2109 MHz. If those values are the same or substantially the same, the method next compares measurements at 2102 MHz and 2108 MHz, and so forth. If the samples in all of the pairs resemble each other and if the inclination from the first resemblance up to the peak is "satisfactory", i.e., the inclination exceeds a threshold, then a signal recognition (shape match) is declared.

The signal recognition method may always start at one end of a frequency band, but it will be understood that the algorithm can instead start in the middle or at another point in a frequency band. Selection of the starting point can be based on previous experience.

It will be understood that whether values are "substantially the same" can be experimentally determined. A UE fresh from the factory would typically have settings of the parameters BWAcc, IncThresh, etc., and those parameters would be adapted as the UE experiences (e.g., finds carriers with) other settings. By adapting the parameters based on experience, the specific shape sought can be said to be itself adjusted based on experience. In addition, it will be understood that a "satisfactory inclination" up to a peak depends on the relative widths of the channel and the receive filter. A typical receive filter width for a 5-MHz channel can vary based on implementation. For example, today's typical filter width may be 5 MHz, but other widths are possible, e.g., 200 KHz.

In FIGS. 6A, 6B, 6C, Z samples are compared with each other, and it is not necessary that the samples be compared in pairs (unless, of course, Z=1). When Z>1, arrays of samples are advantageously pair-wise compared rather than pairs. Comparing arrays can be beneficial in the case that one sample sticks out (despite the enhancement technique applied).

FIGS. 6A, 6B, 6C show several parameters (e.g., IncIThresh, BWAcc, etc.) that the UE can experiment with in searching for suspected carriers. For example, the UE can remember such parameters based on its previous experience in a country or area. It would of course be beneficial, although not necessary, for a UE to share its experience with other UEs. As just one example of such sharing, experience could be transferred from a user's old UE to the user's new UE.

In addition, although the preceding description states that, starting at 2100 MHz, a sample is compared to a peer at 2110 MHz, it should be noted that in FIGS. 6A, 6B, 6C, the parameter BWAcc more generally enables searching around 2110 MHz for the best-fit samples. Thus, Z samples at 2100 MHz are compared to Z samples around 2110 MHz, and the frequency having the least difference is assumed, e.g., 2109 MHz.

A UE functioning according to the present invention will (compared to a UE with traditional cell searching algorithms) consume much less time and energy on finding the correct frequency band. This significantly improves the UE's PLMN scans and performance in scenarios in which the UE needs to regain service after moving between geographic areas where different frequency bands are employed for communication.

Looked at from one point of view, an embodiment of this invention can comprise three process loops, which can be carried out in any or all of the frequency bands that a UE supports. Loop 1 includes obtaining an energy scan, e.g., an RSSI scan, of a band. Loop 2 includes trying to identify possible carriers by "plotting" the energy-scan values for the band, comparing "parts" of the band with a "typical shape", and saving data that enables identification of any possible carriers found. Loop 3 includes performing a cell search for the possible carriers found.

Figure 7:
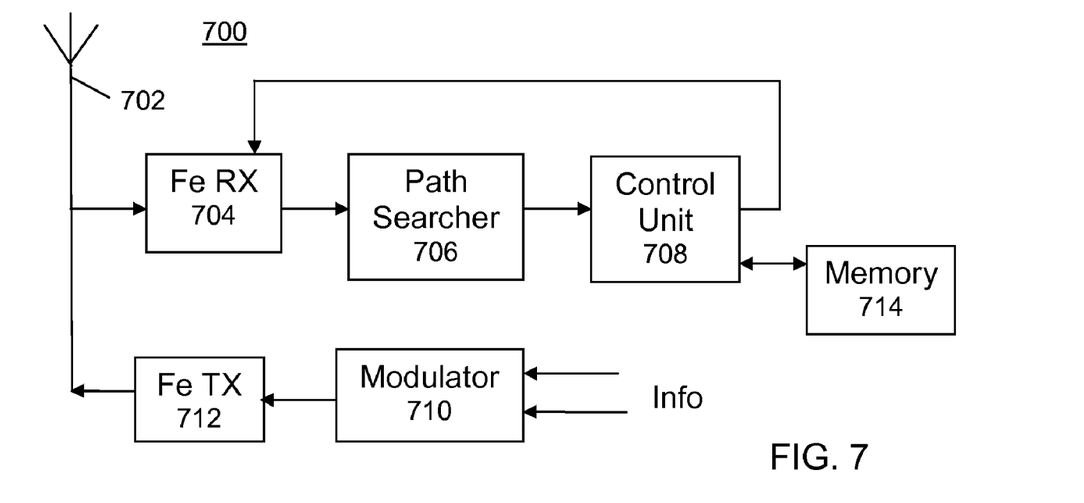
FIG. 7 is a block diagram of a user equipment in a communication system.

FIG. 7 is a block diagram of a portion of a UE 700 that is suitable for implementing the methods described above. For simplicity, only some parts of the UE 700 are shown in the figure. It will also be understood that the UE can be implemented by other arrangements and combinations of the functional blocks shown in FIG. 7.

Signals transmitted by RBSs are received through an antenna 702 and down-converted to base-band signals by a front-end receiver (Fe RX) 704. On a regular basis for all detected cells, the received signal code power (RSCP) is estimated and the received signal strength indicator (RSSI) is computed by a path searcher 706. An RSCP can be estimated by, for example, de-spreading the base-band signal from a detected cell with the scrambling code (and common pilot channel (CPICH) channelization code) corresponding to the cell. Methods of computing RSSIs are well known in the art. In suitable communication systems, for example, the RSSI can be estimated by computing the variance of the received signal over a given time period, such as one time slot (e.g., 0.67 ms). Information from the path searcher 706 is provided to a control unit 708, which uses the information in searching for suitable shapes in the RSSI according to the methods described above. Based on the results of such searches and other factors, the control unit 708 controls the operation of the Fe RX 704. The UE 700 also typically includes a front-end transmitter (Fe TX) 710 that up-converts or otherwise transforms a modulation signal for transmission to RBSs through the antenna 702.

The control unit 708 and other blocks of the UE 700 can be implemented by one or more suitably programmed electronic processors, collections of logic gates, etc. that processes information stored in one or more memories 714. As explained above, the stored information may include characteristics of shapes that correspond to RBS signals and lists of available and neighboring PLMNs and most recently used frequencies and frequency band, which a control unit 708 can use in determining and selecting cells in accordance with the features of this invention. It will be appreciated that the control unit typically includes timers, etc. that facilitate its operations.

Figure 8:
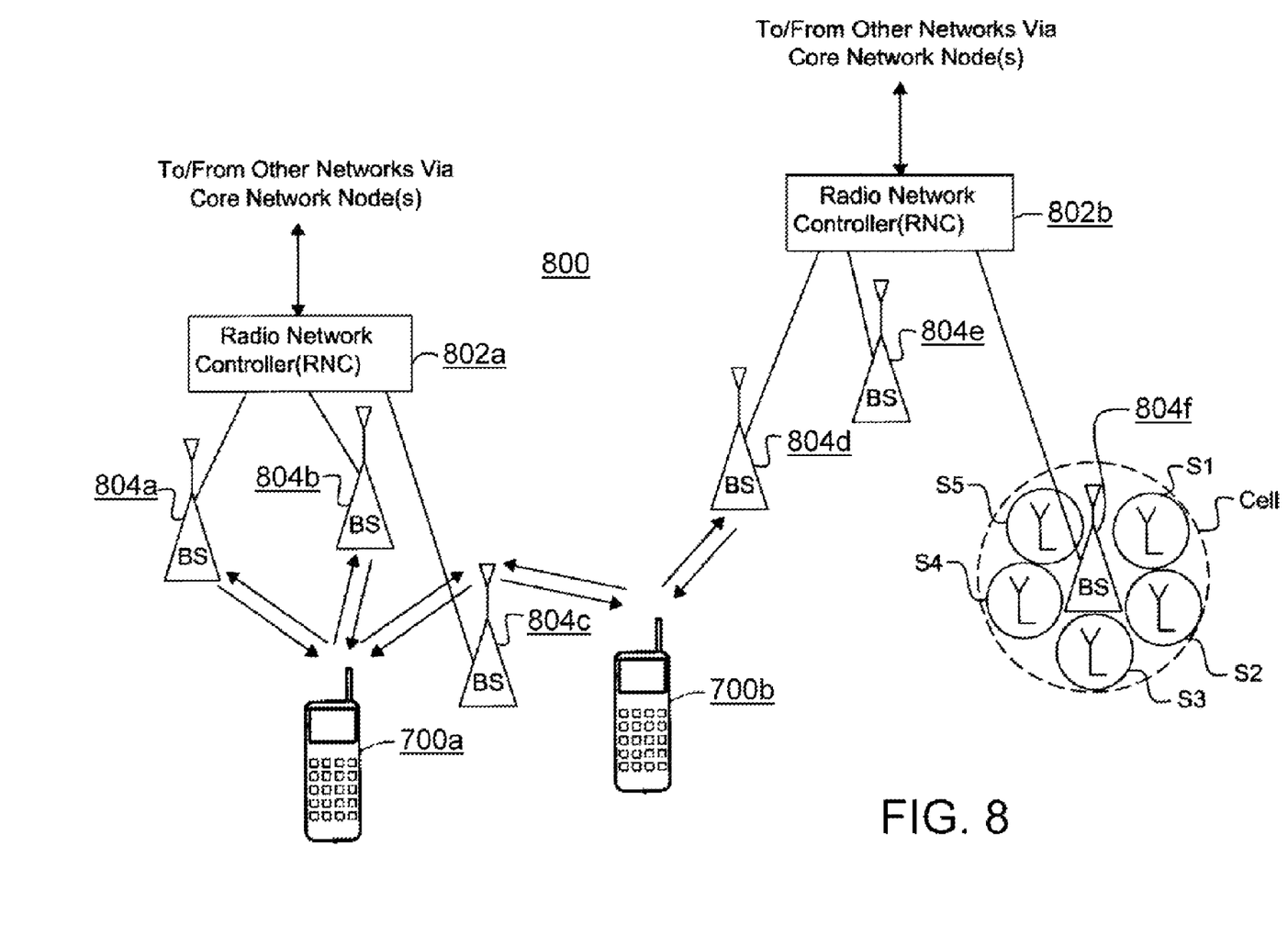
FIG. 8 is a block diagram of a communication system.

FIG. 8 is a diagram of a PLMN 800, which may be, for example, a WCDMA communication system. Radio network controllers (RNCs) 802*a*, 802*b* control various radio network functions, including for example radio access bearer setup, diversity handover, etc. More generally, each RNC directs UE calls via the appropriate RBSs, which communicate with UEs 700*a*, 700*b* through downlink (i.e., base-to-mobile, or forward) and uplink (i.e., mobile-to-base, or reverse) channels. RNC 802*a* is shown coupled to RBSs 804*a*, 804*b*, 804*c*, and RNC 802*b* is shown coupled to RBSs 804*d*, 804*e*, 804*f*. Each RBS, which is called a Node B in 3GPP parlance, serves a geographical area that can be divided into one or more cell(s). RBS 804*f* is shown as having five antenna sectors S1-S5, all or some of which can be said to make up the cell of the RBS 804*f*. The RBSs are coupled to their corresponding RNCs by dedicated telephone lines, optical fiber links, microwave links, etc. Both RNCs 802*a*, 802*b* are typically connected with external networks such as the PSTN, the Internet, etc. through one or more core network nodes, such as an MSC and/or a packet radio service node (not shown). The artisan will understand that the components and arrangement depicted in FIG. 8 are examples and should not be construed as limiting the components and arrangement of an actual communication system.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a communication system of recognizing a presence of a transmitter based on signal measurements, comprising:
   measuring a received energy at a plurality of different frequencies in a frequency band;
   enhancing the measured received energies such that noise in the measured received energies is reduced; and
   determining whether the measured received energies include a specific spectral shape, wherein determining comprises comparing at least one measured received energy to at least one other measured received energy, the measured received energies having been measured at different frequencies, thereby recognizing the presence of the transmitter, and if a comparison of an initial pair of measured received energies indicates that the measured received energies are substantially the same, determining further comprises successively comparing pairs of measured received energies at successively closer frequencies, comparing an inclination from an initial measured received energy to a peak received energy to a threshold, and determining that the specific spectral shape is included based on the comparisons.

2. The method of claim 1, wherein the measuring step comprises measuring a radio-frequency power in a bandwidth received by a user equipment on each of the plurality of different frequencies.

3. The method of claim 1, wherein the enhancing step comprises filtering the measured received energies.

4. The method of claim 1, wherein the specific spectral shape has a spectral width that corresponds to a convolution of a filter bandwidth and a transmitter bandwidth.

5. The method of claim 1, further comprising, if it is determined that the measured received energies do not include the specific spectral shape, the step of repeating the measuring, enhancing, and determining steps.

6. The method of claim 5, wherein the measuring, enhancing, and determining steps are repeated after lapse of a specific period of time.

7. The method of claim 1, further comprising, if it is determined that the measured received energies include the specific spectral shape, searching for the transmitter at frequencies around the specific spectral shape.

8. The method of claim 7, wherein if it is determined that the received energies include more than one specific spectral shape, searching for the transmitter having a highest measured received energy.

9. The method of claim 1, further comprising the step of adjusting the specific spectral shape based on experience.

10. An apparatus in a communication system for recognizing a presence of a transmitter based on signal measurements, comprising:
   a device configured to measure a received energy at a plurality of different frequencies in a frequency band;
   an enhancer configured such that noise in the measured received energies is reduced; and
   a processor configured to determine whether the measured received energies include a specific spectral shape, thereby recognizing the presence of the transmitter;
   wherein the processor is configured to compare at least one measured received energy to at least one other measured received energy, the measured received energies having been measured at different frequencies, and if a comparison of an initial pair of measured received energies indicates that the measured received energies are substantially the same, the processor further successively compares pairs of measured received energies at successively closer frequencies, compares an inclination from an initial measured received energy to a peak received energy to a threshold, and determines that the specific spectral shape is included based on the comparisons.

11. The apparatus of claim 10, wherein the measuring step comprises measuring a radio-frequency power in a bandwidth received by a user equipment on each of the plurality of different frequencies.

12. The apparatus of claim 10, wherein the enhancer comprises a median filter.

13. The apparatus of claim 10, wherein the specific spectral shape has a spectral width that corresponds to a convolution of a filter bandwidth and a transmitter bandwidth.

14. The apparatus of claim 10, wherein, if the processor determines that the measured received energies do not include the specific spectral shape, a new set of received energies are measured and enhanced, and the processor determines whether the new set of measured received energies includes a specific spectral shape.

15. The apparatus of claim 14, wherein the new set of received energies are measured and enhanced after lapse of a specific period of time.

16. The apparatus of claim 10, further comprising a device for searching for the transmitter at frequencies around a specific spectral shape.

17. The apparatus of claim 16, wherein if the processor determines that the received energies include more than one specific spectral shape, the searching device searches for the transmitter having a highest measured received energy.

18. The apparatus of claim 10, wherein the processor is configured to adjust the specific spectral shape based on experience.

19. A computer-readable medium having stored non-transient instructions that, when executed by a computer system, cause the computer system to carry out a method in a communication system of recognizing a presence of a transmitter based on signal measurements, wherein the method comprises:

measuring a received energy at a plurality of different frequencies in a frequency band;

enhancing the measured received energies such that noise in the measured received energies is reduced; and determining whether the measured received energies include a specific spectral shape, wherein determining comprises comparing at least one measured received energy to at least one other measured received energy, the measured received energies having been measured at different frequencies, thereby recognizing the presence of the transmitter, and if a comparison of an initial pair of measured received energies indicates that the measured received energies are substantially the same, determining further comprises successively comparing pairs of measured received energies at successively closer frequencies, comparing an inclination from an initial measured received energy to a peak received energy to a threshold, and determining that the specific spectral shape is included based on the comparisons.

20. The medium of claim 19, wherein the method further comprises, if it is determined that the measured received energies do not include the specific spectral shape, repeating the measuring, enhancing, and determining steps.

21. The medium of claim 19, wherein the method further comprises, if it is determined that the measured received energies include the specific spectral shape, searching for the transmitter at frequencies around the specific spectral shape.

22. The medium of claim 21, wherein if it is determined that the received energies include more than one specific spectral shape, searching for the transmitter having a highest measured received energy.

* * * * *

UNITED STATES PATENT AND TRADEMARK OFFICE
CERTIFICATE OF CORRECTION

PATENT NO. : 7,970,361 B2  
APPLICATION NO. : 11/946142  
DATED : June 28, 2011  
INVENTOR(S) : G. Nader et al.

Page 1 of 2

It is certified that error appears in the above-identified patent and that said Letters Patent is hereby corrected as shown below:

In Fig. 5, Sheet 3 of 7, delete "  " and insert --  --, therefor.

Signed and Sealed this  
Twenty-eighth Day of February, 2012

David J. Kappos  
*Director of the United States Patent and Trademark Office*

CERTIFICATE OF CORRECTION (continued)
U.S. Pat. No. 7,970,361 B2

In Fig. 5, Sheet 3 of 7, delete " " and insert -- --, therefor.

In Fig. 6A, Sheet 4 of 7, in Box "614", in Line 2, delete "CarrBandWith" and insert -- CarrBandWidth --, therefor.

In Fig. 6B, Sheet 5 of 7, in Box "618", in Line 1, delete "DiffTresh" and insert -- DiffThresh --, therefor.

In Fig. 6B, Sheet 5 of 7, in Box "622", in Line 2, delete "(CarrBandWlth" and insert -- (CarrBandWidth --, therefor.

In Fig. 6B, Sheet 5 of 7, in Box "626", in Line 1, delete "Invalld" and insert -- Invalid --, therefor.

In Fig. 6B, Sheet 5 of 7, in Box "630", in Line 1, delete "MatchStartIncx" and insert -- MatchStartIndx --, therefor.

In Column 8, Line 60, delete "InclThresh," and insert -- InclThresh, --, therefor.

In Column 9, Line 38, delete "IncThresh," and insert -- InclThresh, --, therefor.

In Column 9, Lines 55-56, delete "IncI-Thresh," and insert -- InclThresh, --, therefor.